United States Patent
Cheng et al.

(10) Patent No.: US 9,753,519 B2
(45) Date of Patent: Sep. 5, 2017

(54) SPECULATIVE SYSTEM START-UP TO IMPROVE INITIAL END-USER INTERACTION RESPONSIVENESS

(75) Inventors: Antonio S. Cheng, Portland, OR (US); Faraz A. Siddiqi, Portland, OR (US)

(73) Assignee: Intel Corporatoin, Santa Clara, CA (US)

( * ) Notice: Subject to any disclaimer, the term of this patent is extended or adjusted under 35 U.S.C. 154(b) by 89 days.

(21) Appl. No.: 13/997,063

(22) PCT Filed: Oct. 14, 2011

(86) PCT No.: PCT/US2011/056302
§ 371 (c)(1),
(2), (4) Date: Mar. 10, 2014

(87) PCT Pub. No.: WO2013/055354
PCT Pub. Date: Apr. 18, 2013

(65) Prior Publication Data
US 2014/0215248 A1    Jul. 31, 2014

(51) Int. Cl.
*G06F 1/32* (2006.01)
(52) U.S. Cl.
CPC .......... *G06F 1/3234* (2013.01); *G06F 1/3231* (2013.01); *Y02B 60/1289* (2013.01)
(58) Field of Classification Search
CPC .............................. G06F 9/4403; G06F 1/3231
USPC ....................................................... 713/323
See application file for complete search history.

(56) References Cited

U.S. PATENT DOCUMENTS

| | | | |
|---|---|---|---|
| 6,266,776 B1 * | 7/2001 | Sakai | 713/300 |
| 6,654,895 B1 | 11/2003 | Henkhaus et al. | |
| 8,645,736 B1 * | 2/2014 | Tabone | G06F 9/4418 713/300 |
| 2004/0088589 A1 * | 5/2004 | Westerinen et al. | 713/300 |

(Continued)

FOREIGN PATENT DOCUMENTS

| | | |
|---|---|---|
| CN | 101098530 A | 1/2008 |
| CN | 103907077 A | 7/2014 |

(Continued)

OTHER PUBLICATIONS

International Search Report and Written Opinion received for PCT application No. PCT/US2011/056302, mailed on Jul. 31, 2012, 10 pages.

(Continued)

*Primary Examiner* — Thomas Lee
*Assistant Examiner* — Santosh R Poudel
(74) *Attorney, Agent, or Firm* — Jordan IP Law, LLC

(57) ABSTRACT

Methods and systems may include a human interface device (HID) and logic to place the HID in a blocked state in response to a request to power off the system. The logic can also use a speculative start-up heuristic to establish one or more subsequent operating states for the system while the HID is in the blocked state, wherein the background automatic state transitions may maximize battery life when a user is not present. In addition, the HID may be removed from the blocked state in response to a request to power on the system. Accordingly, the speculative start-up heuristic can make system "ready-to-use" before the user actually interacts with any inputs (e.g. power button, or touch screen) of the system.

22 Claims, 1 Drawing Sheet

(56) References Cited

U.S. PATENT DOCUMENTS

| | | | |
|---|---|---|---|
| 2004/0162922 A1* | 8/2004 | Kardach et al. ................ 710/15 |
| 2005/0182978 A1* | 8/2005 | Anderson ............. G06F 1/3234 |
| | | | 713/300 |
| 2006/0047980 A1* | 3/2006 | Price ................... G06F 1/3203 |
| | | | 713/300 |
| 2006/0053311 A1 | 3/2006 | Chary |
| 2006/0143483 A1 | 6/2006 | Liebenow |
| 2006/0190635 A1* | 8/2006 | Kojou ............................ 710/15 |
| 2007/0234093 A1* | 10/2007 | Kimura ................ G06F 1/3203 |
| | | | 713/323 |
| 2008/0005381 A1 | 1/2008 | Theocharous et al. |
| 2008/0005423 A1 | 1/2008 | Jacobs et al. |
| 2008/0126815 A1* | 5/2008 | Cantwell et al. ............. 713/323 |
| 2008/0201595 A1 | 8/2008 | Kawasaki |
| 2009/0228725 A1 | 9/2009 | Carroll |
| 2010/0115309 A1 | 5/2010 | Carvalho et al. |
| 2010/0226487 A1* | 9/2010 | Harder et al. ........... 379/202.01 |
| 2010/0318817 A1* | 12/2010 | Nanbu ................ G06F 11/1441 |
| | | | 713/300 |
| 2011/0082987 A1* | 4/2011 | Sauber et al. ................ 711/161 |
| 2011/0185208 A1 | 7/2011 | Iwamoto et al. |
| 2012/0147531 A1* | 6/2012 | Rabii ................ H04W 52/0254 |
| | | | 361/679.01 |
| 2012/0191990 A1* | 7/2012 | Hodge ................ G06F 11/3055 |
| | | | 713/300 |
| 2012/0311361 A1* | 12/2012 | Locker et al. ................ 713/323 |

FOREIGN PATENT DOCUMENTS

| | | |
|---|---|---|
| JP | 2005-266995 A | 9/2005 |
| JP | 2009-020663 A | 1/2009 |
| JP | 2014528619 A | 10/2014 |
| JP | 5906516 B2 | 4/2016 |
| TW | 200627137 A | 8/2006 |
| TW | I292865 B | 1/2008 |
| TW | 200828067 A1 | 7/2008 |
| TW | 201329696 A | 7/2013 |
| WO | 2013/055354 A1 | 4/2013 |

OTHER PUBLICATIONS

International Preliminary Report on Patentability and Written Opinion received for PCT Patent Application No. PCT/US2011/056302, mailed on Apr. 24, 2014, 7 pages.
Notice of Allowance for Taiwanese Patent Application No. 101135610, mailed on Dec. 26, 2016, 4 pages including 1 page of English translation.
"Advanced Configuration Power Interface Specification", dated Apr. 5, 2010, 66 pages, Hewlett-Packard Corporation et al.
Search Report for Taiwanese Patent Application No. 101135610, dated Apr. 9, 2015, 2 pages, including 1 page of English translation.
European Search Report for EP Patent Application No. 11873901.0, dated May 8, 2015, 9 pages.
Office Action for Japanese Patent Application No. 2014-535702, dated Jun. 30, 2015, 3 pages. Includes 2 pages of English translation.
Notification of Grant for Chinese Application No. 201180074510.8, dated Apr. 1, 2017, 4 pages, including 2 pages of English translation.

\* cited by examiner

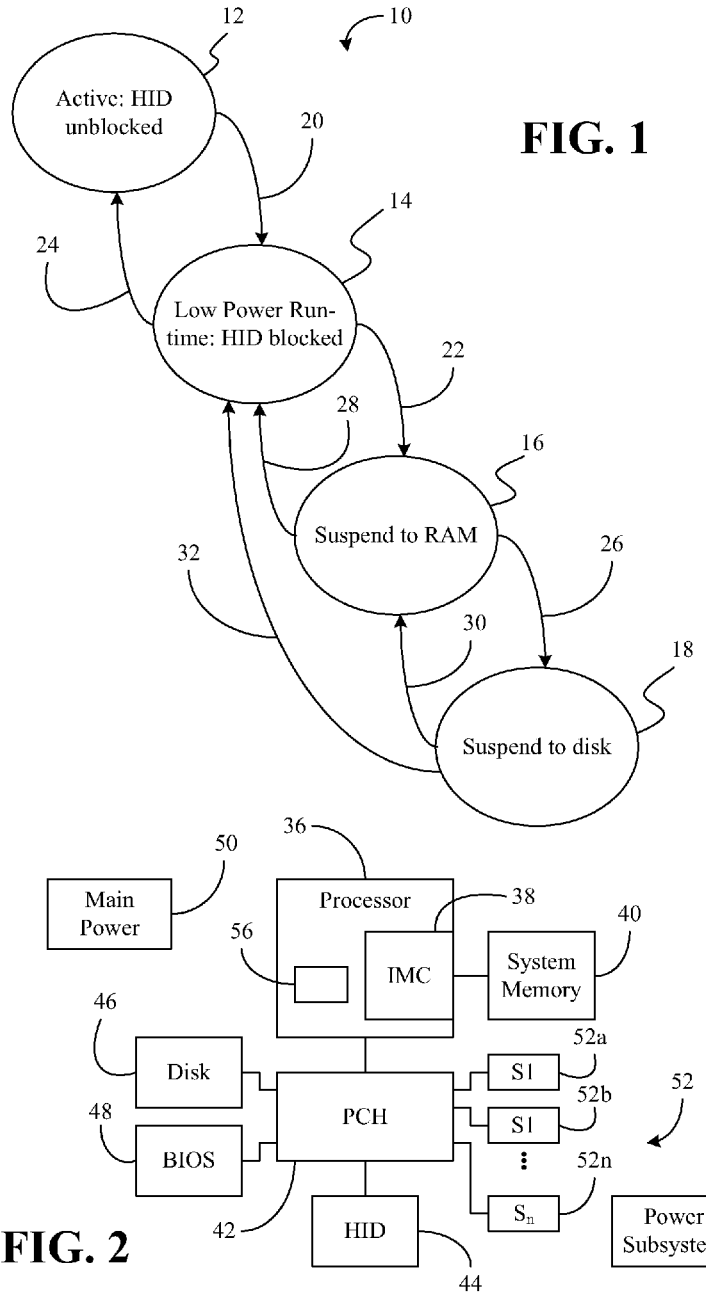

SPECULATIVE SYSTEM START-UP TO IMPROVE INITIAL END-USER INTERACTION RESPONSIVENESS

BACKGROUND

Technical Field

Embodiments generally relate to computing system boot times. More particularly, embodiments relate to using speculative start-up heuristics to predict when users will activate computing systems.

Discussion

Although certain "instant-on" solutions for computing systems may represent an effort to reduce boot times, there remains considerable room for improvement. For example, these solutions may still result in delays, can involve relatively high power states (e.g., sleep instead of shutdown), may utilize different run-time environments (e.g., single function quick start applications), and/or may be limited to systems that have different start buttons (e.g., single function media buttons).

BRIEF DESCRIPTION OF THE DRAWINGS

The various advantages of the embodiments of the present invention will become apparent to one skilled in the art by reading the following specification and appended claims, and by referencing the following drawings, in which:

FIG. 1 is a state diagram of an example of a speculative start-up heuristic implementation according to an embodiment; and FIG. 2 is a block diagram of an example of a computing system according to an embodiment.

DETAILED DESCRIPTION

Embodiments may involve a computer implemented method in which a human interface device (HID) is placed in a blocked state in response to a request to power off a system associated with the HID. The method may also provide for using a speculative start-up heuristic to establish one or more subsequent operating states for the system while the HID is in the blocked state. In addition, the HID can be removed from the blocked state in response to a request to power on the system.

In addition, embodiments can include a system having an HID and logic to place the HID in a blocked state in response to a request to power off the system. The logic may also use a speculative start-up heuristic to establish one or more subsequent operating states for the system while the HID is in the blocked state, and remove the HID from the blocked state in response to a request to power on the system.

Other embodiments may include a non-transitory computer readable storage medium having a set of instructions which, if executed by a processor, cause a computer to place an HID in a blocked state in response to a request to power off a system associated with the HID. The instructions, if executed, can also cause a computer to use a speculative start-up heuristic to establish one or more subsequent operating states for the system while the HID is in the blocked state. In addition, the instructions may cause a computer to remove the HID from the blocked state in response to a request to power on the system.

Turning now to FIG. 1, a state diagram 10 representing a speculative start-up heuristic implementation is shown, wherein the heuristic may be used to predict user/individual activity with regard to a computing system such as a mobile Internet device (MID), personal digital assistant (PDA), notebook computer, netbook device, tablet device, and so forth. In general, the illustrated approach provides for placing the computing system in various operating states based on whether it is predicted that user might activate the computing system. In particular, the operating states may include states such as an active state 12, a low power run-time state 14, a suspend to random access memory (RAM) state 16, a suspend to disk state 18, and so forth, wherein the prediction can enable the computing system to appear to have instant-on functionality from the perspective of the user.

One or more of the illustrated states 12, 14, 16, 18 could be configured according to a standardized protocol such as, for example, the ACPI (Advanced Configuration and Power Interface Specification, e.g., ACPI Specification, Ref 4.0a, Apr. 5, 2010) protocol, wherein "shallower" states may provide greater functionality, faster boot times and less power savings, and "deeper" states may provide less functionality, slower boot times and greater power savings. In one example, the active (e.g, shallowest) state 12 could represent the "S0" ACPI state, the low power run-time state 14 may represent an intermediate state, the suspend to RAM state 16 may represent the "S3" ACPI state, and the suspend to disk (e.g., deepest) state 18 can represent the "S4/S5" ACPI states.

In the illustrated example, a number of criteria/triggers may be used to select an operating state for the computing system. For example, if the computing system is in the active state 12, a user of the computing system might perform some action (e.g., closing the lid of a laptop, pressing a power off button, making an operating system/OS shutdown request) to indicate a desire to power off the computing system, wherein the user request to power off the system can constitute a trigger 20 to place the computing system in the low power run-time state 14. The illustrated low power run-time state 14 involves placing one or more a human interface device (HIDs) such as an embedded display, touch screen, etc., in a blocked state so that the computing system appears to the user to be powered off.

When the computing system is placed in the low power run-time state 14, a number of additional activities may be conducted to implement the speculative start-up heuristic. For example, one or more timers and low power sensors such as, for example, motion sensors, (e.g. accelerometers, gyroscopes), ambient light sensors, proximity sensors (e.g. electrostatic field disturbance), near field communication sensors (e.g. pairing system) and so forth, may be armed in response to the trigger 20, wherein if it is determined that the one or more sensors have been silent (e.g., inactive, not triggered, etc.) for a certain inactivity period of time (e.g., x minutes) another trigger 22 may take place. If, on the other hand, the user performs a "wake action" (e.g., opening the lid of a laptop, pressing a power on button) to indicate a desire to power on the computing system before the prescribe period of time expires, the wake action can constitute a trigger 24 to return the computing system to the active state 12.

The illustrated trigger 22 causes the computing system to be placed in the suspend to RAM state 16, wherein the suspend to RAM state 16 may involve flushing any caches (e.g., level one/L1 cache, level two/L2 cache) resident on the processors of the system to a RAM (e.g., system memory), of the computing system. Once the caches have been flushed, the processors and/or portions thereof (e.g., cores, "uncores") could be shut down to conserve power and extend battery life, wherein the RAM remains powered on.

In addition, one or more low power sensors and timers may again be armed and/or reset in the suspend to RAM state 16. As will be discussed in greater detail, the sensors and time periods associated with the timers may be the same or different from those armed when entering the low power run-time state 14 via the trigger 20. Moreover, each sensor may have its own timer depending upon the type of sensor and the particular usage model that is in effect.

If it is determined that the one or more sensors have been silent for the prescribed period of time (e.g., y minutes), a trigger 26 to place the computing system in the suspend to disk state 18 may occur. If, on the other hand, one or more of the sensors is no longer silent (e.g., a motion sensor detects motion, an ambient light sensor detects light), such "non-wake" activity may be deemed indicative of an increased likelihood that a user will attempt to activate the computing system in the near future. Accordingly, a trigger 28 may be used to return the computing system to the shallower low power run-time state 14 (while the HID remains blocked). The return to the low power run-time state 14 via the trigger 28 may be associated with certain latency causing activities such as, initialization and/or self test processes. Thus, the illustrated approach enables these latency causing activities to be conducted in the background while the computing system appears to be powered off.

The suspend to disk state 18 may involve flushing the RAM to non-volatile memory such as a solid state disk (SSD), optical disk, hard disk drive (HDD), and so forth. Once the RAM has been flushed, it might be shut down to further conserve power and extend battery life. Accordingly, zero or near-zero power consumption could be achieved in the suspend to disk state 18. The suspend to disk state 18 may also incorporate a time of day condition, wherein if it is determined that the time of day condition (e.g., current time is between 9:00 AM and 5:00 PM) is satisfied, a trigger 30 could be used to return the computing system to the shallower suspend to RAM state 16. Accordingly, the illustrated approach is able to maintain the computing system in shallower states during the day (e.g., when usage is more likely to occur), and maintain the computing system in deeper states at night (e.g., when usage is less likely to occur). Indeed, the speculative start-up heuristic could be made to be time of day dependent from a broader point of view.

TABLE I

|  | Period 1 | Period 2 | Sensors Used |
|---|---|---|---|
| Day | x | y | S1, S2, S3 |
| Night | x/2 | y/2 | 51 |

For example, Table I above demonstrates that both the timers and the sensors used can be time of day dependent. Thus, during the day, the time period associated with the trigger 22 may be "x", whereas at night, the time period associated with the trigger 22 could be "x/2" in order to enable more rapid descent to the suspend to RAM state 16. Similarly, during the day, the time period associated with the trigger 26 might be "y", whereas at night, the same time period could be set to "y/2" in order to enable more rapid descent to the suspend to disk state 18. Additionally, the sensors used to predict future usage may be time of day dependent. For example, three sensors (e.g., motion, ambient light and proximity) could be used during the day to achieve greater sensitivity, whereas only one sensor (ambient light) might be used at night. Similar dependencies may be established for other usage patterns/distinctions such as days of the week, seasons, and so forth. Moreover, the dependencies can be programmable by the user or other system component. Indeed, the dependencies could be self-tuning based on the accuracy of past predictions to obtain a fully adaptive speculative start-up heuristic.

If activity is detected in one or more of the sensors, a trigger 32 may be used to transition the computing system from the suspend to disk state 18 to the low power run-time state 14 (while the HID remains blocked). The state transitions associated with the triggers 30, 32 may be associated with certain latency causing activities that can be conducted in the background, as already noted. Thus, managing the various suspend states 16, 18 while the HID is blocked enables the computing system to achieve a seemingly instant-on functionality. The illustrated suspend states 16, 18 may also have direct triggers (not shown) back to the active state 12, similar to the trigger 24, for scenarios in which the speculative start-up heuristic might not have correctly predicted a start-up request from the user.

FIG. 2 shows a computing system 34 that is able to speculatively start-up based on predictions of user behavior. The computing system 34 may be an MID, PDA, notebook computer, netbook device, tablet device, and so forth, wherein the illustrated example includes a processor 36 with an integrated memory controller (IMC) 38 that provides access to system memory 40, which could include, for example, double data rate (DDR) synchronous dynamic random access memory (SDRAM, e.g., DDR3 SDRAM JEDEC Standard JESD79-3C, April 2008) modules. The modules of the system memory 40 may be incorporated, for example, into a single inline memory module (SIMM), dual inline memory module (DIMM), small outline DIMM (SODIMM), and so on. The processor 36 may also have one or more processor cores (not shown), where each core may be fully functional with instruction fetch units, instruction decoders, level one (L1) cache, execution units, and so on. The processor 36 could alternatively communicate with an off-chip variation of the IMC 38, also known as a Northbridge, via a front side bus or a point-to-point fabric that interconnects each of the components in the system 34.

The illustrated processor 36 communicates with a platform controller hub (PCH) 42, also known as a Southbridge, via a hub bus. The IMC 38/processor 36 and the PCH 42 are sometimes referred to as a chipset. The processor 36 may also be operatively connected to a network (not shown) via a network port through the PCH 42 and various other controllers (not shown). The illustrated system 34 also includes an HID 44 such as a touch screen, display, keypad, mouse, etc., in order to allow a user to interact with and perceive information from the system 34. A basic input/output system (BIOS) 48 and a disk 46, which may include an SSD, HDD, optical disk, flash memory, etc., can also be coupled to the PCH 46. A main power system 50 may include one or more voltage rails that provide power to the aforementioned components.

The illustrated system 34 also includes one or more low power sensors 52 (52a-52n), a power subsystem 54 and logic 56 to establish operating states for the system 34 and speculatively start-up the system 34. In particular, the logic 56 may be configured to place the HID 44 in a blocked state in response to a request to power off the system 34. The request could involve, for example, a user closing the lid of a laptop without making a corresponding request for closed lid audio output from the laptop. The request could also be generated by an automated software component, an off-platform network device, and so forth. The illustrated logic 56 also uses a speculative start-up heuristic to establish one or more subsequent operating states for the system 34 while the HID 44 is in the blocked state. Thus, the logic 56 could provide for placing the system 34 in a suspend state such as a suspend to RAM state 16 (FIG. 1) in which data is flushed to the system memory 40 and one or more portions of the processor 36 are powered down. The logic 56 could also provide for placing the system 34 in a suspend to disk state 18 (FIG. 1) in which data is flushed to the disk 46 and the system memory 40 is powered down.

The logic 56 may use the sensors 52 and one or more speculative start-up heuristic conditions to determine whether the user is expected to activate the system 34. For example, a first sensor ("S1") 52a could be a motion sensor that detects movement of the computing system 34 (e.g., tablet), wherein detected movement might correspond to the user removing the computing system 34 from a bag and placing it on a desk. In addition, a second sensor ("S2") 52b could be an ambient light sensor that might also detect the computing system 34 being moved from a bag and placed on a desk. Moreover, an nth sensor ("Sn") 52n might be a proximity sensor that detects the user's presence in the vicinity of the computing system 34. Since the majority of the computing system 34 may be powered down during the detection period, the illustrated computing system 34 also includes a power subsystem 54 that is capable of providing the minimal amount of power that may be needed for the sensors 52 to detect the various speculative start-up heuristic-related conditions.

If the sensors 52 are no longer silent, the illustrated logic 56 may transition the computing system 34 into a shallower state while the HID 44 is kept in the blocked state. The transition into the shallower state might involve initating one or more routines of the BIOS and/or other system components. Accordingly, although the computing system 34 may be in the process of "warming up", it can appear to be powered off from the perspective of the user. The logic 56 might be implemented as a set of instructions stored in a machine- or computer-readable storage medium such as RAM, read only memory (ROM), programmable ROM (PROM), firmware, flash memory, etc., in configurable logic such as programmable logic arrays (PLAs), field programmable gate arrays (FPGAs), complex programmable logic devices (CPLDs), in fixed-functionality hardware using circuit technology such as application specific integrated circuit (ASIC), complementary metal oxide semiconductor (CMOS) or transistor-transistor logic (TTL) technology, or any combination thereof. For example, computer program code to carry out operations shown in the logic 56 may be written in any combination of one or more programming languages, including an object oriented programming language such as Java, Smalltalk, C++ or the like and conventional procedural programming languages, such as the "C" programming language or similar programming languages.

The pseudo code in Table II below demonstrates one example of an implementation as described herein:

TABLE II

System is in the active state.
User turns off the system (e.g., closes lid and there is no audio output)
System arms a delay shutdown time and arms one or more sensors (e.g., low power S0 state)
If no movement is detected on accelerometer and proximity sensor for a period of time, system goes into standby
If no movement is detected on accelerometer and proximity sensor for a longer period of time, system goes into 0 W off state
Timer behavior may be adaptive to usage patterns TABLE II-continued Sufficient movement of the system or human proximity can cause the system to wake into the active state.
   No display (user does not know the system is running until pressing the on "button/slider")
   Transition is silent (e.g., SSD)
System returns to low power S0 state.

Simply put, low power sensors (e.g., <1 mW) and adaptive heuristics may be used to predict when users/individuals will use computer systems. The techniques described herein can enable instant-on functionality without resulting in delays, involving relatively high power states, utilizing different run-time environments, or being limited to systems that have different start buttons.

Embodiments described herein are applicable for use with all types of semiconductor integrated circuit ("IC") chips. Examples of these IC chips include but are not limited to processors, controllers, chipset components, programmable logic arrays (PLAs), memory chips, network chips, digital signal processing (DSP) chips and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more wired or wireless signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. An apparatus comprising:
one or more sensors; and
logic to,
place a human interface device in a blocked state in response to a request to power off a system;
use a time of day dependent speculative start-up heuristic to establish one or more subsequent operating states for the system while the human interface device is in the blocked state; and
remove the human interface device from the blocked state in response to a request to power on the system,
wherein the one or more sensors are to monitor the system during the blocked state, and the system is to transition to one or more of a suspend to random access memory (RAM) state or a suspend to disk state based on a result of the monitoring.

2. The apparatus of claim 1, wherein the logic is to,
identify inactivity in the one or more sensors associated with the system, and
place the system in a suspend state in response to the identified inactivity.

3. The apparatus of claim 2, wherein the logic is to select at least one of the one or more sensors based at least in part on the speculative start-up heuristic, and wherein the one or more sensors are to include at least one of a motion sensor, an ambient light sensor, a near field communications sensor and a proximity sensor.

4. The apparatus of claim 2, wherein the logic is to determine an inactivity period of time based at least in part on the speculative start-up heuristic.

5. The apparatus of claim 2, wherein the system is to be placed in the suspend to RAM state and the logic is to remove the system from the suspend to RAM state in response to activity in at least one of the one or more sensors.

6. The apparatus of claim 2, wherein the system is to be placed in the suspend to disk state and the logic is to remove the system from the suspend to disk state in response to at least one of a time of day condition and activity in at least one of the one or more sensors.

7. The apparatus of claim 2, wherein the system operates in combination with the human interface device and the one or more sensors.

8. The apparatus of claim 1, wherein the time of day dependent speculative start-up heuristic is to be used to establish at least one of the one or more subsequent operating states.

9. A non-transitory computer readable storage medium comprising a set of instructions which, if executed by a processor, cause a system to:
place a human interface device in a blocked state in response to a request to power off the system;
monitor the system during the blocked state using one or more sensors;
use a time of day dependent speculative start-up heuristic to establish one or more subsequent operating states for the system while the human interface device is in the blocked state;
transition the system to one or more of a suspend to random access memory (RAM) state or a suspend to disk state based on a result of the monitoring; and
remove the human interface device from the blocked state in response to a request to power on the system.

10. The medium of claim 9, wherein the instructions, if executed, cause the system to:
identify inactivity in the one or more sensors associated with the system; and
place the system in a suspend state in response to the identified inactivity.

11. The medium of claim 10, wherein the instructions, if executed cause the system to select at least one of the one or more sensors based at least in part on the speculative start-up heuristic, and wherein the one or more sensors are to include at least one of a motion sensor, an ambient light sensor, a near field communications sensor and a proximity sensor.

12. The medium of claim 10, wherein the instructions, if executed, cause the system to determine an inactivity period of time based at least in part on the speculative start-up heuristic.

13. The medium of claim 10, wherein the system is to be placed in the suspend to RAM state and the instructions, if executed, cause a computer to remove the system from the suspend to RAM state in response to activity in at least one of the one or more sensors.

14. The medium of claim 10, wherein the system is to be placed in the suspend to disk state and the instructions, if executed, cause a computer to remove the system from the suspend to disk state in response to at least one of a time of day condition and activity in at least one of the one or more sensors.

15. The medium of claim 9, wherein the time of day dependent speculative start-up heuristic is to be used to establish at least one of the one or more subsequent operating states.

16. A computer implemented method comprising:
placing a human interface device in a blocked state in response to a request to power off a system associated with the human interface device;
monitoring the system during the blocked state using one or more sensors;
using a time of day dependent speculative start-up heuristic to establish one or more subsequent operating states for the system while the human interface device is in the blocked state;
transitioning to one or more of a suspend to random access memory (RAM) state or a suspend to disk state based on a result of the monitoring; and
removing the human interface device from the blocked state in response to a request to power on the system.

17. The method of claim 16, wherein using the speculative start-up heuristic to establish one or more subsequent operating states includes:
identifying inactivity in the one or more sensors associated with the system; and
placing the system in a suspend state in response to the identified inactivity.

18. The method of claim 17, further including selecting at least one of the one or sensors based at least in part on the speculative start-up heuristic, wherein the one or more sensors include at least one of a motion sensor, an ambient light sensor, a near field communications sensor and a proximity sensor.

19. The method of claim 17, further including determining an inactivity period of time based at least in part on the speculative start-up heuristic.

20. The method of claim 17, wherein the system is placed in the suspend to RAM state and the method further includes removing the system from the suspend to RAM state in response to activity in at least one of the one or more sensors.

21. The method of claim 17, wherein the system is placed in the suspend to disk state and the method further includes removing the system from the suspend to disk state in response to at least one of a time of day condition and activity in at least one of the one or more sensors.

22. The method of claim 16, wherein the time of day dependent speculative start-up heuristic is used to establish at least one of the one or more subsequent operating states.

* * * * *